US012688016B2

(12) United States Patent　　　　(10) Patent No.:　US 12,688,016 B2
Tagashira et al.　　　　　　　　　　(45) Date of Patent:　　　Jul. 21, 2026

(54) SCHEDULE OPTIMIZATION SYSTEM CONSTRUCTION SUPPORT DEVICE AND SCHEDULE OPTIMIZATION SYSTEM CONSTRUCTION SUPPORT METHOD

(71) Applicant: Hitachi, Ltd., Tokyo (JP)

(72) Inventors: Fumito Tagashira, Tokyo (JP); Yui Ogura, Tokyo (JP); Yuichi Kobayashi, Tokyo (JP); Keitaro Uehara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 280 days.

(21) Appl. No.: 18/467,383

(22) Filed: Sep. 14, 2023

(65) Prior Publication Data

US 2024/0241700 A1　　Jul. 18, 2024

(30) Foreign Application Priority Data

Jan. 18, 2023　　(JP) ................................. 2023-005955

(51) Int. Cl.
　　*G06F 8/35*　　　　　(2018.01)
　　*G06Q 10/0631*　　　(2023.01)
(52) U.S. Cl.
　　CPC ......... *G06F 8/35* (2013.01); *G06Q 10/06311* (2013.01)
(58) Field of Classification Search
　　CPC ............................ G06F 8/35; G06Q 10/06311
　　See application file for complete search history.

(56) References Cited

U.S. PATENT DOCUMENTS

| | | | | | |
|---|---|---|---|---|---|
| 9,268,537 | B1 * | 2/2016 | Zhang | ........................ | G06F 8/35 |
| 9,286,032 | B2 * | 3/2016 | Feblowitz | ................. | G06F 8/20 |
| 2012/0084748 | A1 * | 4/2012 | Lian | .......................... | G06F 8/35 717/104 |
| 2014/0040855 | A1 * | 2/2014 | Wang | .................... | G06F 30/327 717/107 |
| 2017/0212732 | A1 * | 7/2017 | Kaduwela | ................. | G06F 8/35 |
| 2022/0067632 | A1 * | 3/2022 | Singh | ............... | G06Q 10/06375 |

FOREIGN PATENT DOCUMENTS

| | | |
|---|---|---|
| JP | H07-28650 A | 1/1995 |
| JP | 2021-068010 A | 4/2021 |

* cited by examiner

*Primary Examiner* — Wei Y Mui
*Assistant Examiner* — Travis Viet Tran
(74) *Attorney, Agent, or Firm* — Procopio, Cory, Hargreaves & Savitch

(57)　　　　　ABSTRACT

A schedule optimization system capable of easily solving a complicated optimization problem without using past assets is developed.
A storage unit 120 includes an optimization problem description table indicating an optimization problem for drafting a schedule in a schedule optimization system 300, a scheduled data table indicating a value of a constant being a fixed element in the optimization problem, and a template as a pattern of a source code of the schedule optimization system. A processing unit 130 generates the source code of the schedule optimization system by inserting information based on the optimization problem description table and the scheduled data table into the template.

7 Claims, 15 Drawing Sheets

[FIG. 1]

100

SCHEDULE OPTIMIZATION SYSTEM CONSTRUCTION SUPPORT DEVICE

110

170

| INPUT UNIT | DISPLAY UNIT |
|---|---|

120

130

STORAGE UNIT 121

PROCESSING UNIT 140

OPTIMIZATION PROBLEM DESCRIPTION STORAGE AREA

INPUT ANALYSIS UNIT

122

150

SCHEDULED DATA STORAGE AREA

OUTPUT GENERATION UNIT

123

160

AUXILIARY INFORMATION STORAGE AREA

COMPILATION UNIT

124

TEMPLATE STORAGE AREA

125

SOURCE CODE STORAGE AREA

126

SUMMARY DATA STORAGE AREA

[FIG. 2]
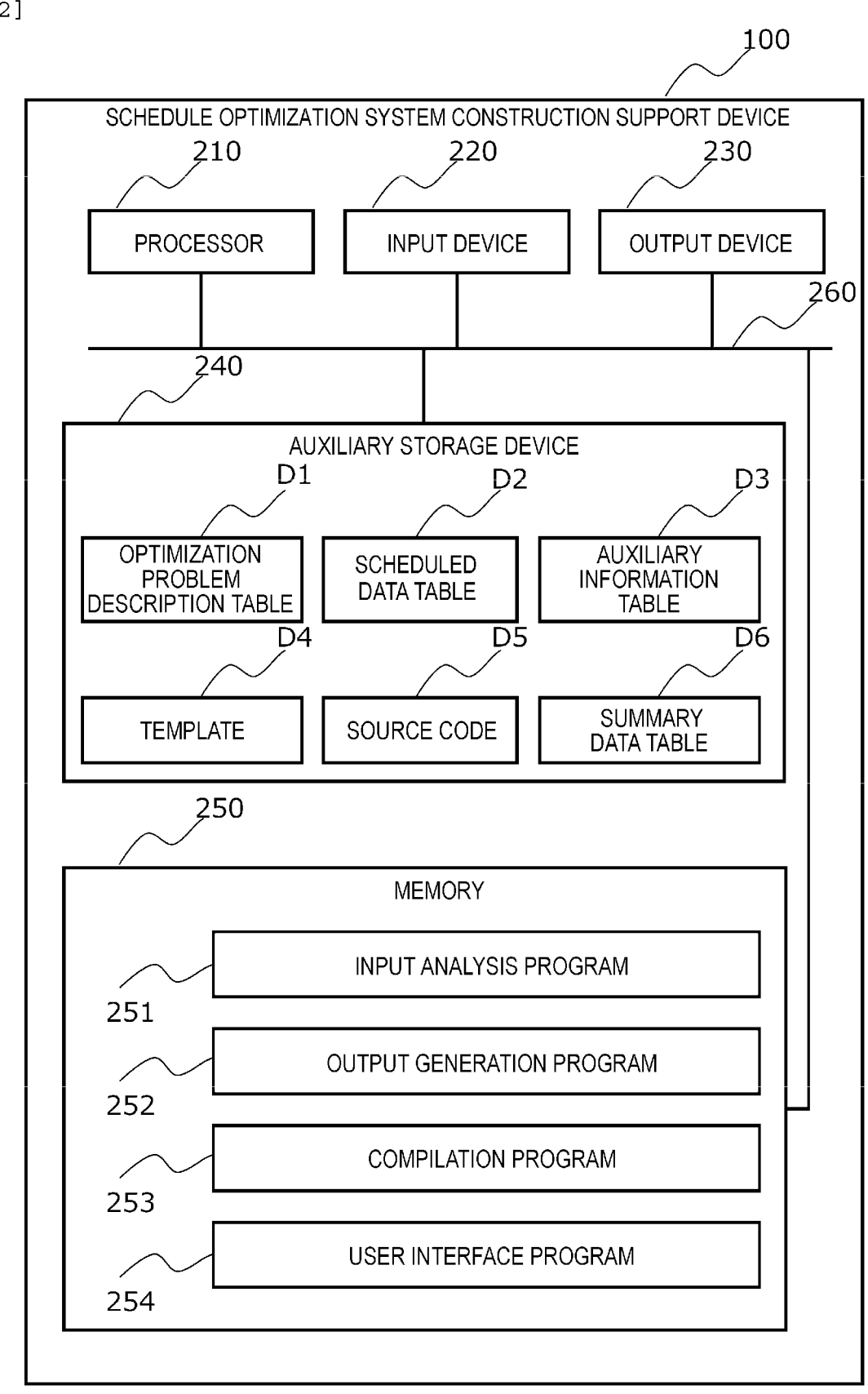

[FIG. 3]

| # | ELEMENT NAME | TYPE | FORMAT | PRIMARY KEY | DEFINITION | OPTIMIZATION DIRECTION |
|---|---|---|---|---|---|---|
| 001 | i | CONSTANT | int | i | - | - |
| 002 | j | CONSTANT | int | j | - | - |
| 003 | a | CONSTANT | int | i, j | - | - |
| 004 | b | CONSTANT | float | - | - | - |
| 005 | x | DETERMINATION VARIABLE | int | i | - | - |
| 006 | obj | DETERMINATION VARIABLE | float | - | - | - |
| 007 | C1 | CONSTRAINT CONDITION | - | i | $0 \leqq x[i]$ if $0 \leqq i \leqq 5$ | - |
| 008 | C2 | CONSTRAINT CONDITION | - | j | $x[0] \leqq a[0][j]$ | - |
| 009 | C3 | CONSTRAINT CONDITION | - | - | $obj == b*x[10]$ | - |
| 010 | F1 | EVALUATION INDEX | - | - | obj | MINIMIZATION |
| ... | ... | ... | ... | ... | ... | ... |

D10  D11  D12  D13  D14  D15  D16

D1 OPTIMIZATION PROBLEM DESCRIPTION TABLE

[FIG. 4]

| # | ELEMENT NAME | PRIMARY KEY 1 | PRIMARY KEY 2 | VALUE |
|---|---|---|---|---|
| 001 | i | 0 | - | 0 |
| 002 | i | 1 | - | 1 |
| 003 | j | - | 0 | 0 |
| 004 | j | - | 1 | 1 |
| 005 | j | - | 2 | 2 |
| 006 | a | 0 | 1 | 7 |
| 007 | a | 0 | 2 | 2 |
| 008 | a | 0 | 3 | 3 |
| 009 | a | 1 | 1 | 1 |
| 010 | a | 1 | 2 | 5 |
| 011 | a | 1 | 3 | 2 |
| 012 | b | - | - | 0.5 |
| ... | ... | ... | ... | ... |

D20   D21   D22   D23

D2 SCHEDULED DATA TABLE

[FIG. 5]

| # | ELEMENT NAME | FORMAT | DETERMINATION METHOD | CONVERSION METHOD | CONSTRAINT CONDITION |
|---|---|---|---|---|---|
| D30 | D31 | D32 | D33 | D34 | D35 |
| 001 | x | int | VARIABLE CONVERSION | x[i] == a[i][0] * (y[i] < 1 ? 1 : 0) | - |
| 002 | obj | float | LINEAR SCHEDULING METHOD | - | - |
| 003 | y | bool | SOLUTION CONSTRUCTION | - | ALLDIFFERENT CONSTRAINT |
| ... | ... | ... | ... | ... | ... |

D3 AUXILIARY INFORMATION TABLE

[FIG. 6]
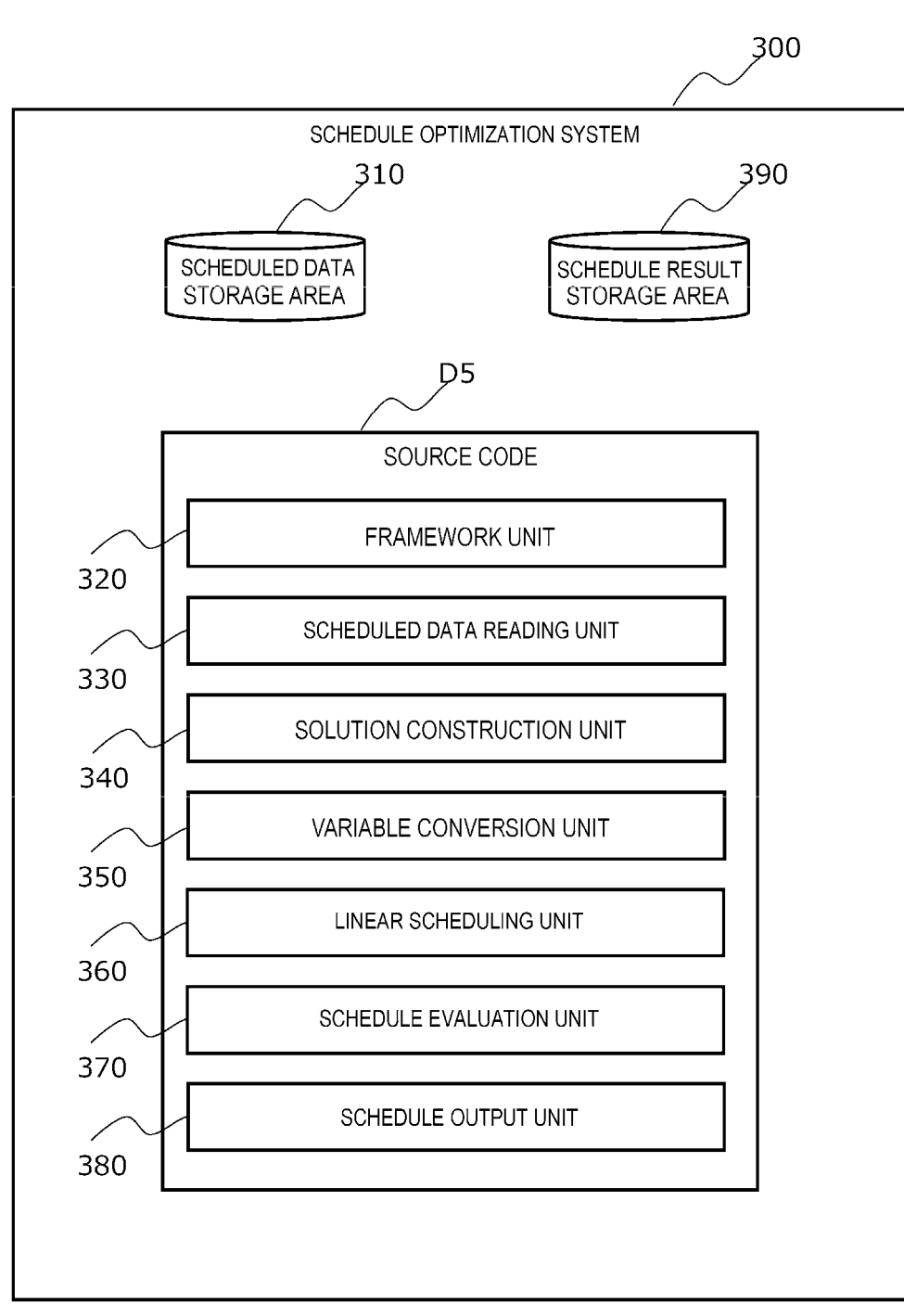

[FIG. 7]
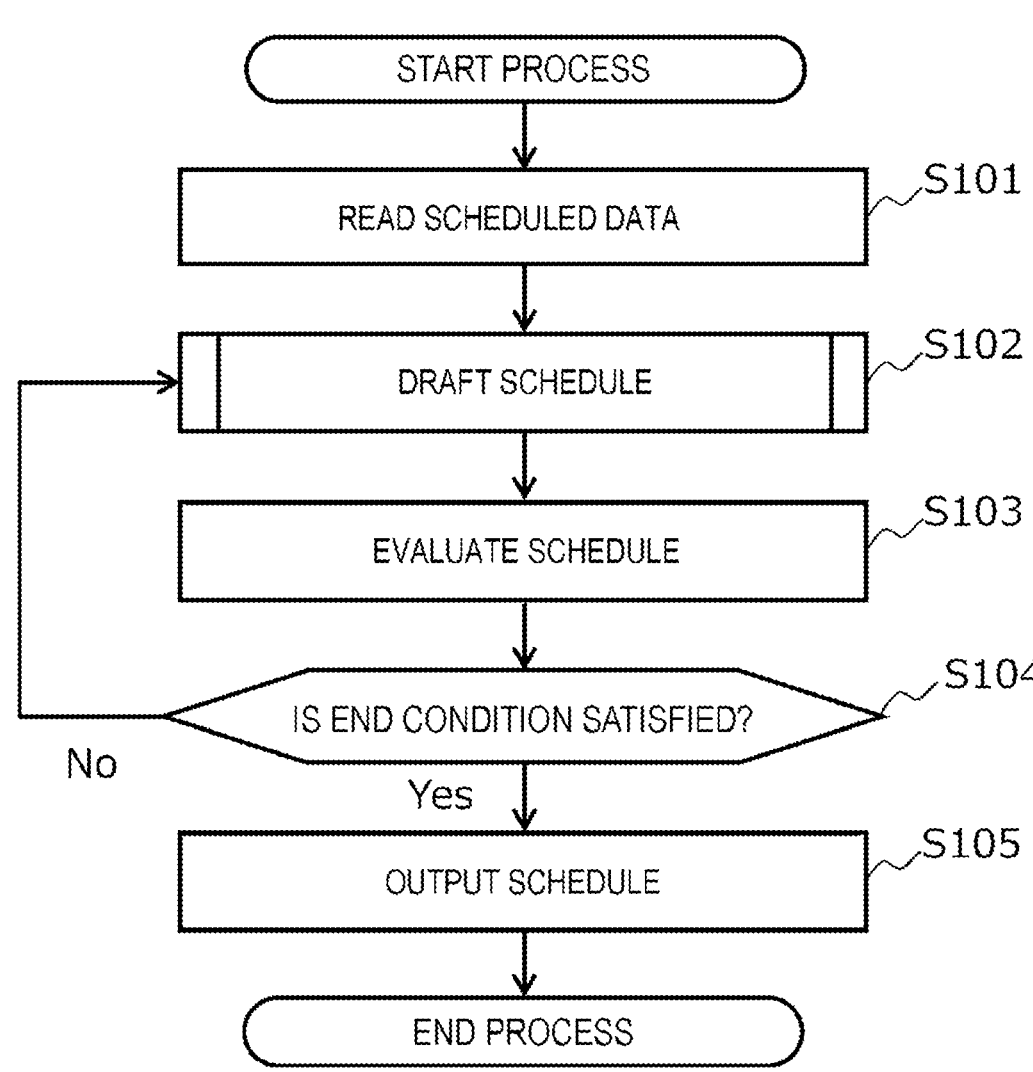

[FIG. 8]
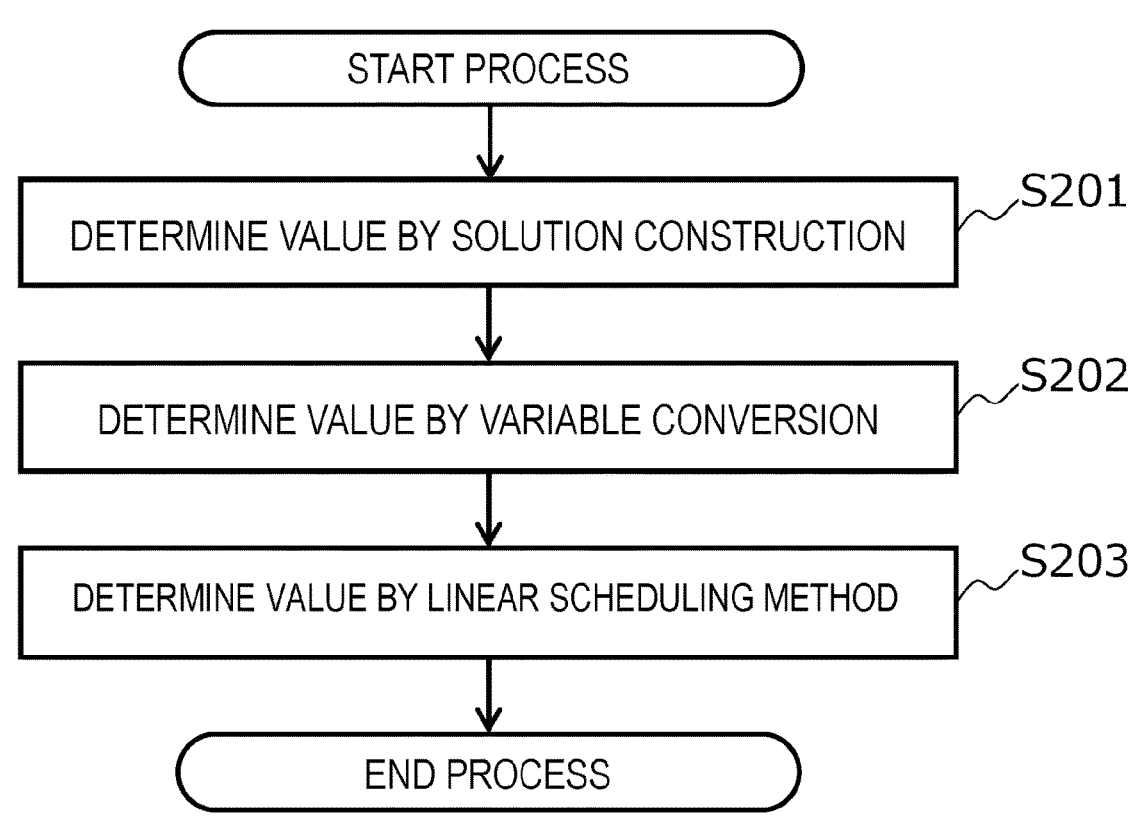

[FIG. 9]
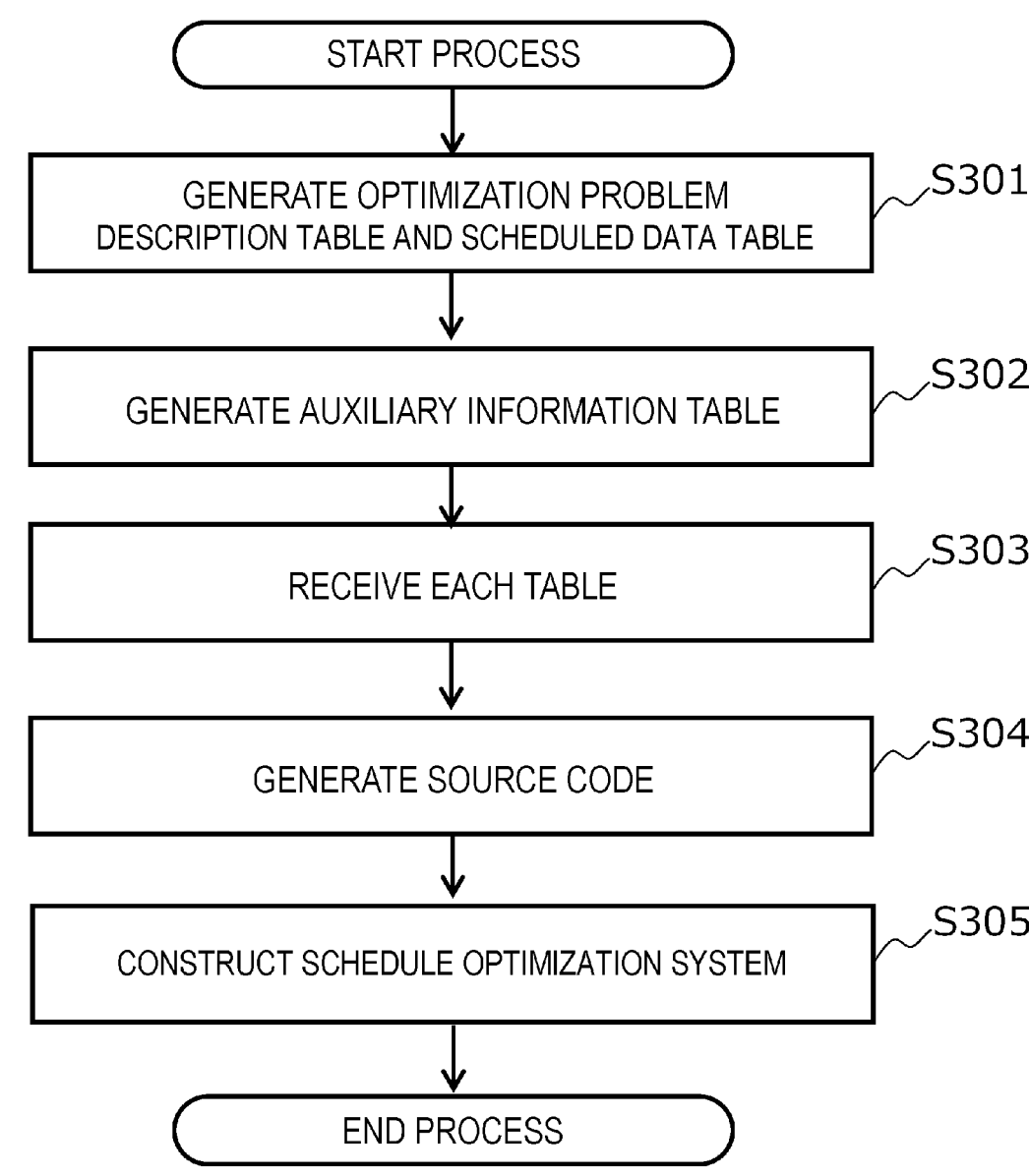

[FIG. 10]
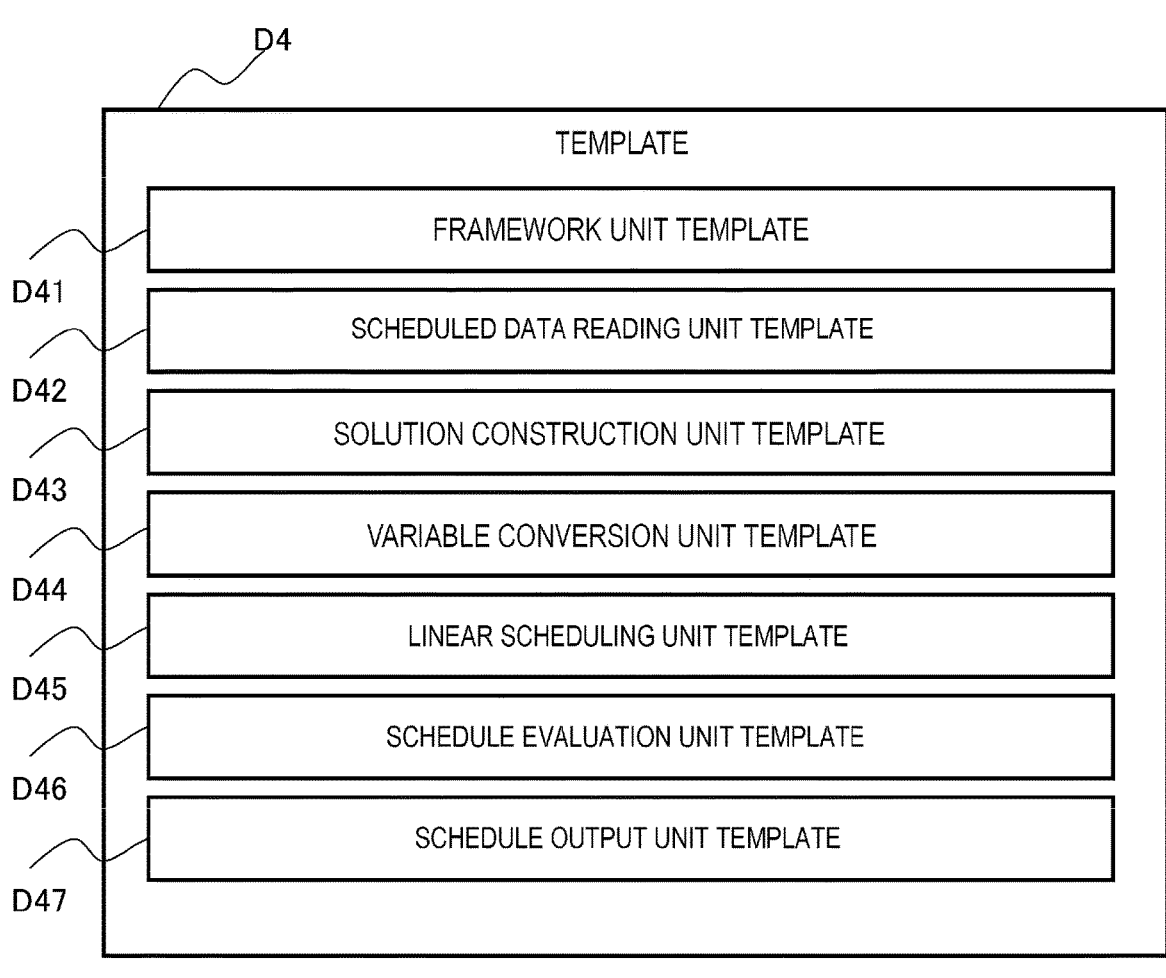

Figure 11:
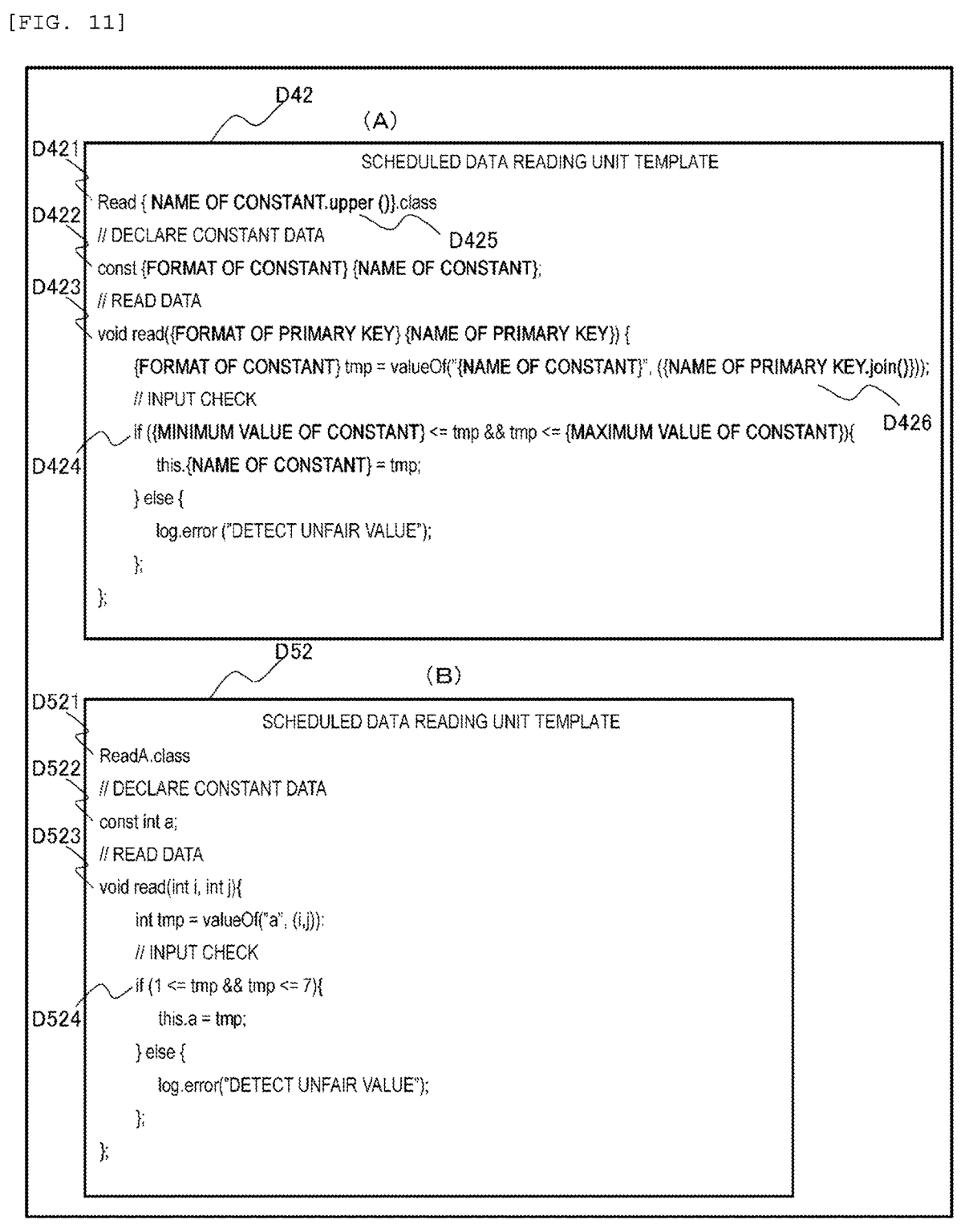

D421 — SCHEDULED DATA READING UNIT TEMPLATE

```
D422   Read { NAME OF CONSTANT.upper ()}.class
       // DECLARE CONSTANT DATA                    D425
       const {FORMAT OF CONSTANT} {NAME OF CONSTANT};
D423   // READ DATA
       void read({FORMAT OF PRIMARY KEY} {NAME OF PRIMARY KEY}) {
           {FORMAT OF CONSTANT} tmp = valueOf("{NAME OF CONSTANT}", ({NAME OF PRIMARY KEY.join()}));
           // INPUT CHECK                                                    D426
           if ({MINIMUM VALUE OF CONSTANT} <= tmp && tmp <= {MAXIMUM VALUE OF CONSTANT}){
D424           this.{NAME OF CONSTANT} = tmp;
           } else {
               log.error ("DETECT UNFAIR VALUE");
           };
       };
```

D52

(B)

D521 — SCHEDULED DATA READING UNIT TEMPLATE

```
D522   ReadA.class
       // DECLARE CONSTANT DATA
       const int a;
D523   // READ DATA
       void read(int i, int j){
           int tmp = valueOf("a", (i,j));
           // INPUT CHECK
           if (1 <= tmp && tmp <= 7){
D524           this.a = tmp;
           } else {
               log.error("DETECT UNFAIR VALUE");
           };
       };
```

[FIG. 12]

[FIG. 13]
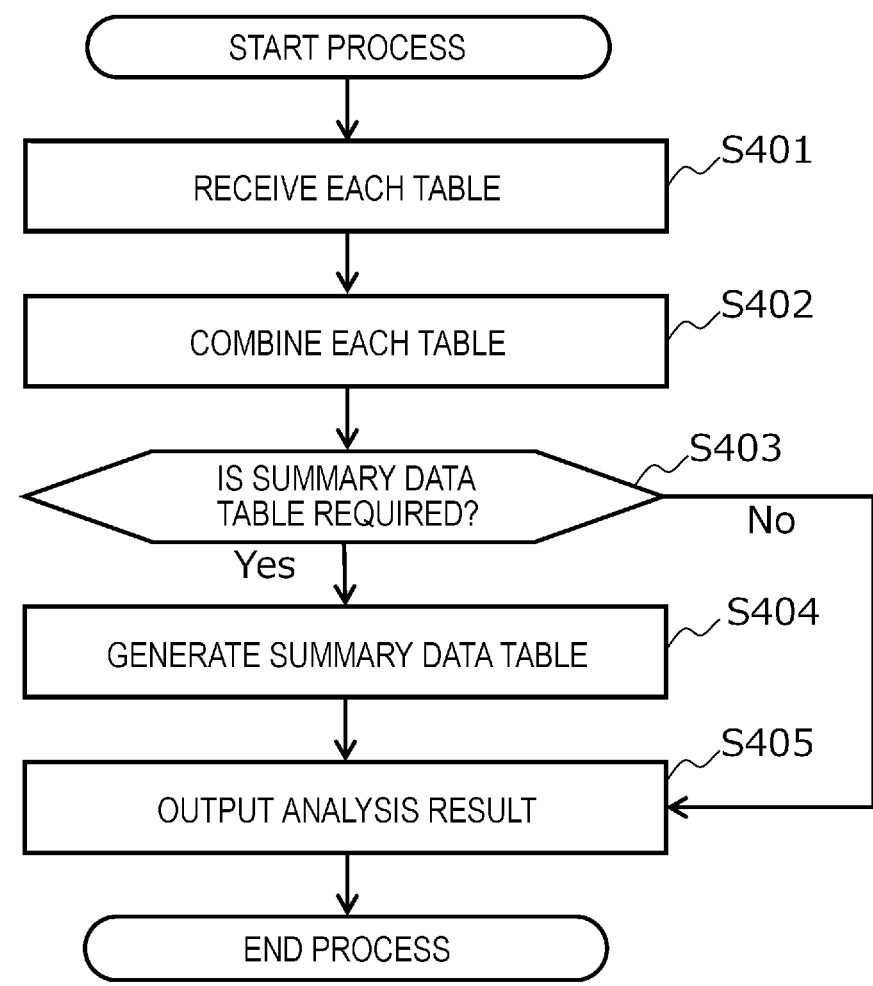

[FIG. 14]
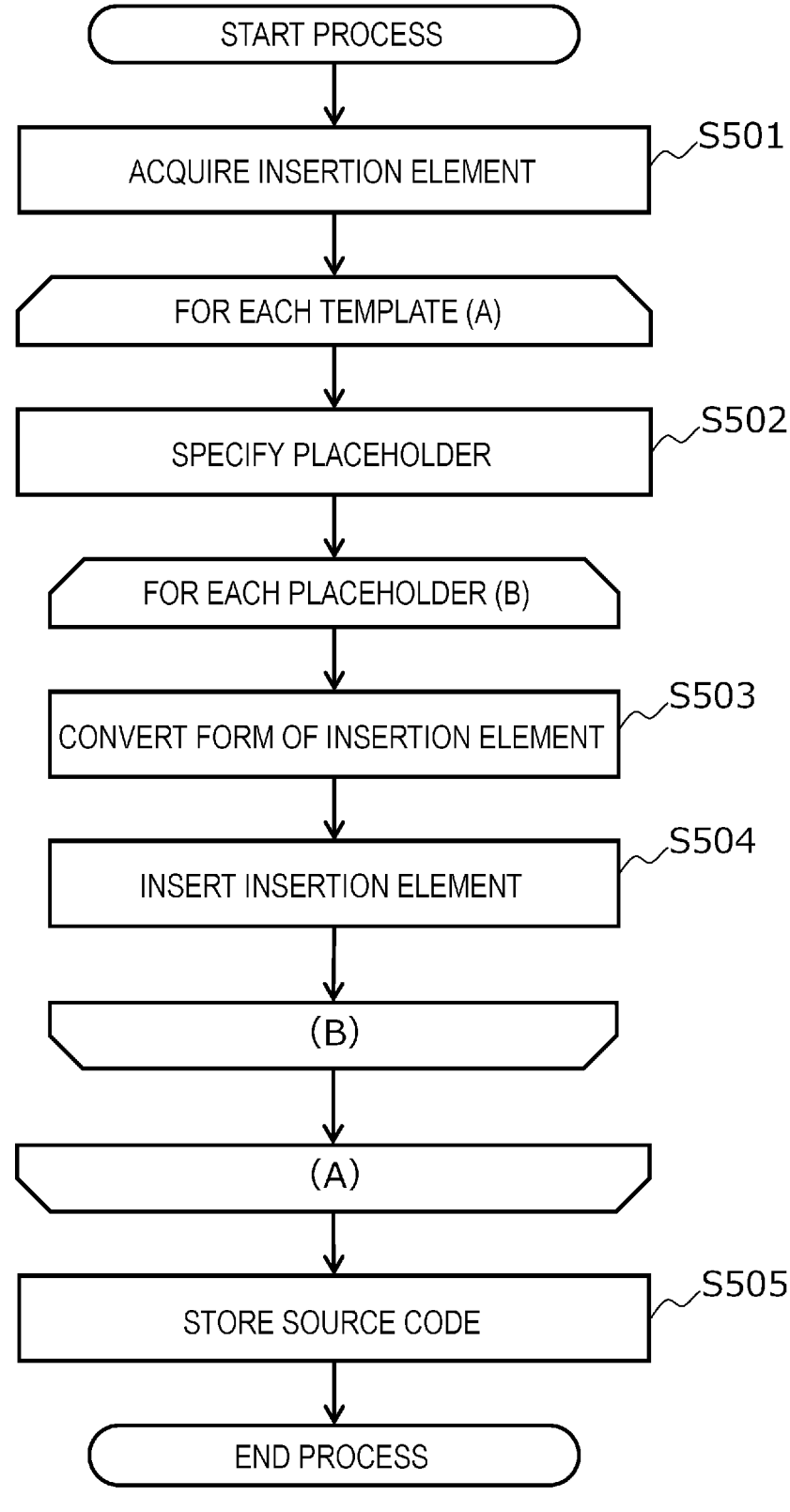

[FIG. 15]
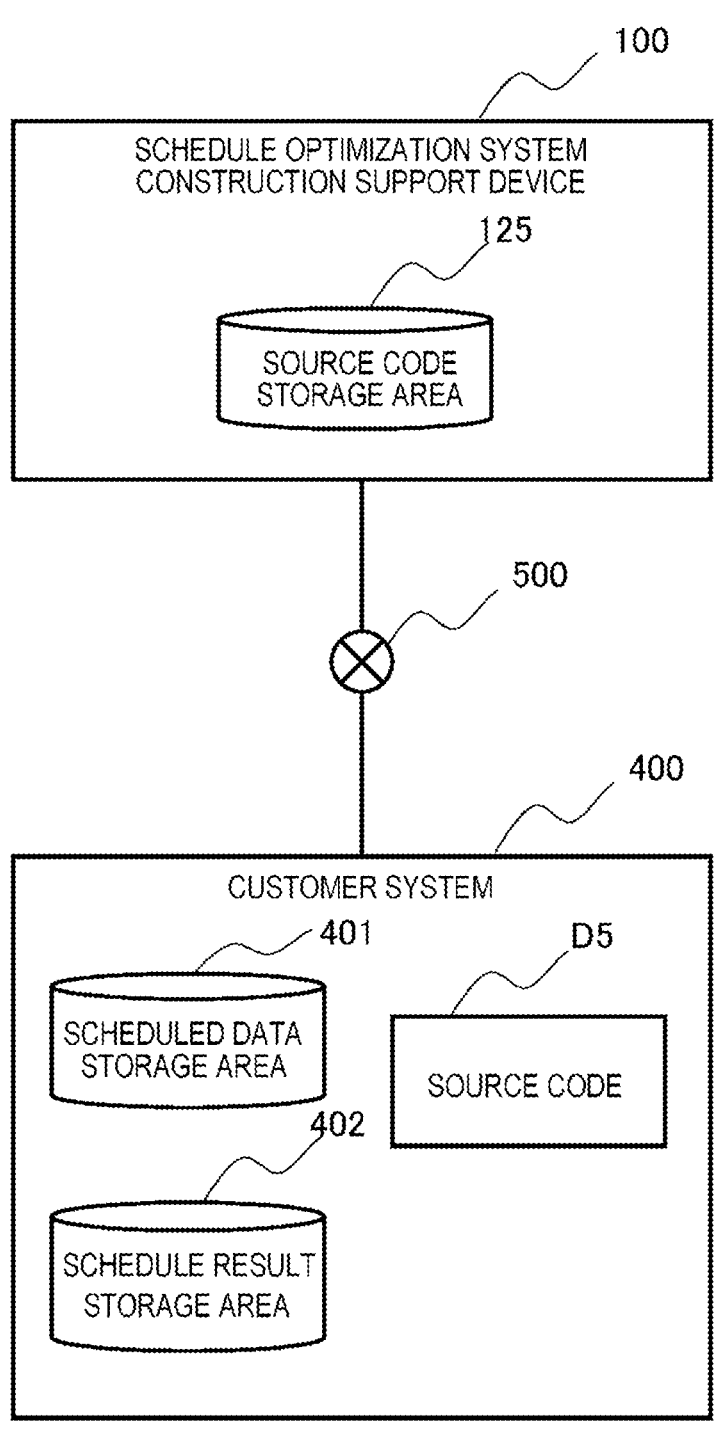

SCHEDULE OPTIMIZATION SYSTEM CONSTRUCTION SUPPORT DEVICE AND SCHEDULE OPTIMIZATION SYSTEM CONSTRUCTION SUPPORT METHOD

TECHNICAL FIELD

The present disclosure relates to a schedule optimization system construction support device and a schedule optimization system construction support method.

BACKGROUND ART

Attention has been paid to a schedule optimization system for drafting a schedule such as a product production schedule or a worker arrangement schedule. The schedule optimization system drafts a schedule by solving an optimization problem according to the schedule that is to be a drafting target, for example, based on scheduled data necessary for drafting the schedule such as data related to products or workers. This type of the schedule optimization system is useful when it is difficult to draft a schedule by hand such as when the size of the scheduled data is large or when the scheduled data is frequently updated.

Reduction of development man-hours is important in the development of the schedule optimization system. As a method of reducing the development man-hours, there is a method of generating a program library that can be generalized and reusing the program library for drafting other schedules. For example, PTL 1 discloses a technique for constructing a software system for drafting a schedule with the small development man-hours by using a constraint problem description language and a general-purpose allocation program library.

In addition, as another method of reducing the development man-hours, by comparing a mathematical model of the schedule optimization system developed in the past with a mathematical model of the schedule optimization system that is a development target, the method of reusing the source code used in the development of the schedule optimization system of the past can be exemplified. For example, PTL 2 discloses a technique in which when comparison is performed between a mathematical model indicating characteristics of the schedule that has been generated and operated in a factory that performs construction the schedule optimization system that is a development target and a mathematical model corresponding to the process of the source code generated at the time when the schedule optimization system in another factory is constructed and it is determined that these mathematical models are similar to each other, the source code is reused.

CITATION LIST

Patent Literature

PTL 1: JPH07-28650A
PTL 2: JP2021-68010A

SUMMARY OF INVENTION

Technical Problem

With the technique described in PTL 1, since only process that can be generalized is made into a program library, a schedule optimization system solving a complicated optimization problem in a short calculation time is not easily developed. For example, when the number of determination variables to be determined in an optimization problem is large and all complicated constraint condition are not easily satisfied, the calculation time of the schedule optimization system is increased. For this reason, it may be difficult to draft a schedule that satisfies the requirements of the customer within a practical time.

In addition, in the technique described in PTL 2, since the assets generated in the past development are reused, there is a problem that, when there are no or few assets generated in the past development, the reduction of the development man-hours cannot be implemented.

An object of the present invention is to provide a schedule optimization system construction support device and a schedule optimization system construction support method that can develop a schedule optimization system capable of easily solving a complicated optimization problem without using past assets.

Solution to Problem

A schedule optimization system construction support device according to one aspect of the present disclosure is a schedule optimization system construction support device supporting construction of a schedule optimization system solving an optimization problem for drafting a schedule, the schedule optimization system construction support device including: a storage unit; and a processing unit, in which the storage unit stores optimization problem information indicating the optimization problem, scheduled data indicating a value of a constant being a fixed element in the optimization problem, and a template as a pattern of a source code of the schedule optimization system, and the processing unit generates the source code by inserting information based on the optimization problem information and the scheduled data into the template.

Advantageous Effects of Invention

According to the present invention, it becomes possible to develop a schedule optimization system capable of easily solving a complicated optimization problem without using past assets.

BRIEF DESCRIPTION OF DRAWINGS

FIG. 1 is a block diagram illustrating a functional configuration of a schedule optimization system construction support device according to an embodiment of the present disclosure.

FIG. 2 is a configuration diagram illustrating a hardware and software configuration of a schedule optimization system construction support device 100.

FIG. 3 is a diagram illustrating a configuration example of an optimization problem description table.

FIG. 4 is a diagram illustrating a configuration example of a scheduled data table.

FIG. 5 is a diagram illustrating a configuration example of an auxiliary information table.

FIG. 6 is a block diagram illustrating a functional configuration of a schedule optimization system.

FIG. 7 is a flowchart illustrating overall processes of the schedule optimization system.

FIG. 8 is a flowchart illustrating a schedule drafting process.

FIG. 9 is a flowchart illustrating overall processes of the schedule optimization system construction support device 100.

FIG. 10 is a diagram illustrating a configuration example of a template.

FIG. 11 is a diagram illustrating an example of a template and a source code.

FIG. 12 illustrates an example of a display screen.

FIG. 13 is a flowchart illustrating an example of an input analysis process.

FIG. 14 is a flowchart illustrating an example of an output generation process.

FIG. 15 is a diagram illustrating an example of a cooperation method between a schedule optimization system construction support device and a customer system.

DESCRIPTION OF EMBODIMENTS

Hereinafter, embodiments of the present disclosure will be described with reference to the drawings.

FIG. 1 is a block diagram illustrating a functional configuration of a schedule optimization system construction support device according to an embodiment of the present disclosure. A schedule optimization system construction support device 100 illustrated in FIG. 1 is a system for constructing a schedule optimization system (refer to FIG. 6) for drafting a schedule such as a product production schedule or a worker arrangement schedule and includes an input unit 110, a storage unit 120, a processing unit 130, and a display unit 170. The drafting the schedule by the schedule optimization system is performed by solving (optimizing) an optimization problem according to the schedule. The drafting target schedule that is a schedule to be drafted by the schedule optimization system is designated by a customer who receives a provision of the schedule optimization system.

The input unit 110 receives various information from the outside of the schedule optimization system construction support device 100. The storage unit 120 stores various information. In this embodiment, the storage unit 120 includes an optimization problem description storage area 121, a scheduled data storage area 122, an auxiliary information storage area 123, a template storage area 124, a source code storage area 125, and a summary data storage area 126.

The optimization problem description storage area 121 stores an optimization problem description table D1 (FIGS. 2 and 3), which is optimization problem information indicating the optimization problem for drafting the schedule in the schedule optimization system constructed by the schedule optimization system construction support device 100. The scheduled data storage area 122 stores a scheduled data table D2 (refer to FIGS. 2 and 4), which is scheduled data indicating values of fixed elements in the optimization problem illustrated in the optimization problem description table D1. The auxiliary information storage area 123 stores an auxiliary information table D3 (refer to FIGS. 2 and 5) which is auxiliary information indicating a constraint condition according to the schedule of the drafting target for the optimization problem illustrated in the optimization problem description table D1. The template storage area 124 stores a template D4 (refer to FIGS. 2, 10 and 11) which is information indicating a pattern for generating a source code of the schedule optimization system. The source code storage area 125 stores a generated source code D5 (refer to FIG. 2) of the schedule optimization system. The summary data storage area 126 stores a summary data table D6 (FIG. 2)

which is summary information summarizing the optimization problem description table D1 and the scheduled data table D2.

The processing unit 130 executes various processes by using various information received by the input unit 110 and various information stored by the storage unit 120. The processing unit 130 includes an input analysis unit 140, an output generation unit 150, and a compilation unit 160.

The input analysis unit 140 performs an input analysis process of analyzing the data received by the input unit 110. The output generation unit 150 various information received by the input unit 110 and various information stored by the storage unit 120 to generate the source code D5 of the schedule optimization system. The compilation unit 160 compiles the source code D5 generated by the output generation unit 150 to generate an executable object code.

The display unit 170 displays various information stored in the storage unit 120.

FIG. 2 is a configuration diagram illustrating a hardware and software configuration of the schedule optimization system construction support device 100. The schedule optimization system construction support device 100 illustrated in FIG. 2 includes, as hardware, a processor 210, an input device 220, an output device 230, an auxiliary storage device 240, and a memory 250, and each hardware is communicatively connected to each other via a bus 260.

The processor 210 loads a program stored in the auxiliary storage device 240 into the memory 250, executes the program, and operates according to the program to implement the input unit 110, the processing unit 130, and the display unit 170. The processor 210 may include a single or a plurality of computing units or processing cores. The input device 220 receives various information from a user who uses the schedule optimization system construction support device 100 and an external device outside the schedule optimization system construction support device 100. The output device 230 includes, for example, a display device and outputs various information to the user and the external device.

The auxiliary storage device 240 is configured with a large-capacity storage device such as a hard disk drive or a solid state drive and is used to store programs and data for a long period of time. The auxiliary storage device 240 functions as the storage unit 120 and stores the optimization problem description table D1, the scheduled data table D2, the auxiliary information table D3, the template D4, the source code D5 and the summary data table D6.

The memory 250 includes a read only memory (ROM), which is a non-volatile storage element, and a random access memory (RAM), which is a volatile storage element. The memory 250 stores the programs loaded by the processor 210 from the auxiliary storage device 240. The programs include an input analysis program 251, an output generation program 252, a compilation program 253 and a user interface program 254 in addition to an operating system (not illustrated). The processor 210 operates according to each of the input analysis program 251, the output generation program 252, and the compilation program 253 and implements the input analysis unit 140, the output generation unit 150, and the compilation unit 160. In addition, the processor 210 operates according to the user interface program 254 to implement the input unit 110 and the display unit 170.

There may be a plurality of configurations of the processor 210, the auxiliary storage device 240, and the like. In addition, the schedule optimization system construction support device 100 may be implemented by, for example, a general-purpose computer or may be implemented by a computer system including a plurality of computers communicably connected to each other via a network.

Hereinafter, the data (the optimization problem description table D1, the scheduled data table D2, and the auxiliary information table D3) stored in the auxiliary storage device 240 will be described below with reference to FIGS. 3 to 5. A hyphen (-) in the figure illustrating these data indicates that the relevant portion is blank.

FIG. 3 is a diagram illustrating a configuration example of the optimization problem description table D1. The optimization problem description table D1 includes a number column D10, a name column D11, a type column D12, a format column D13, a primary key column D14, a definition column D15, and an optimization direction column D16. Each record of the optimization problem description table D1 indicates the respective element constituting the optimization problem.

The number column D10 stores identification numbers for identifying each record of the optimization problem description table D1. The name column D11 stores element names, which are names indicating elements constituting the optimization problem. The type column D12 stores the type indicating the role of the relevant element in the optimization problem. A domain of the type is any one of a "constant", a "determination variable", a "constraint condition", and an "evaluation index".

The format column D13 stores a mode (data format) of the relevant element when the type of the relevant element is the "constant" or the "determination variable". The primary key column D14 stores the primary key that is an element determining the value of the relevant element. The primary key is required when the relevant element is an array. For example, the element "x" with the identification number "005" in FIG. 3 is an array, and the value is determined by the primary key "i".

The definition column D15 stores definition information indicating the definition of the relevant element when the type of the relevant element is "constraint condition" or "evaluation index". In this embodiment, the definition information is a definitional expression described by using a mathematical formula. For example, the definitional expression "$0 \leq x[i]$ if $0 \leq i \leq 5$" for the identification number "007" in FIG. 3 expresses a constraint condition indicating that the element "x" needs to be 0 or more when the primary key "i" is 0 or more and 5 or less. It is noted that the definition information need not be described by using mathematical formulas and may be described by using, for example, a general-purpose optimization problem description language, an application programming interface (API) of an optimization solver, or a programming language.

The optimization direction column D16 stores an optimization direction, which is an attribute of the relevant element, when the type of the relevant element is "evaluation index". A domain of the optimization direction is "maximization" or "minimization". For example, the element "F1" with the identification number "010" in FIG. 3 indicates that the determination variable "obj" is treated as an evaluation index and the optimization problem is solved so as to minimize the determination variable "obj".

FIG. 4 is a diagram illustrating a configuration example of the scheduled data table D2. The scheduled data table D2 includes a number column D20, a name column D21, a primary key column D22, and a value column D23.

The number column D20 stores the identification number for identifying each record of the scheduled data table D2. The name column D21 stores the element name of the element of which the type is a "constant" among the elements constituting the optimization problem. The primary key column D22 stores the value of the primary key of the relevant element. It is noted that, although the number of primary keys is two at maximum in the example of FIG. 4, the number of primary keys is not limited to this example. The value column D23 stores the value of the relevant element when the relevant element has the value of the primary key.

FIG. 5 is a diagram illustrating a configuration example of the auxiliary information table D3. The auxiliary information table D3 contains data dependent on the optimization problem description table D1 and the scheduled data table D2. Since the optimization problem description table D1 and the scheduled data table D2 are information dependent on the drafting target schedule designated by the customer, the auxiliary information table D3 includes information (that is, customer-dependent information) dependent on the drafting target schedule.

The auxiliary information table D3 includes a number column D30, a name column D31, a format column D32, a determination method column D33, a conversion method column D34, and a characteristic constraint condition column D35.

The number column D30 stores identification numbers for identifying each record of the auxiliary information table D3. The name column D31 stores the element names of the element of which the type is the "determination variable" and the element newly added in the auxiliary information table D3 among the elements constituting the optimization problem included in the scheduled data table D2. The format column D32 stores the mode of the relevant element. When the relevant element is included in the optimization problem description table D1, the value of the format column D32 matches the value of the format column D13 of the optimization problem description table D1 corresponding to the relevant element.

The determination method column D33 stores the determination method for determining the relevant element. A domain of the determination method is a "solution construction", a "variable conversion", and a "linear scheduling method" in this embodiment. The "solution construction" is a method of allocating values of the element by using a predetermined algorithm. The "variable conversion" is a method of converting values of other elements allocated in the "solution construction". The "linear scheduling method" is a method of allocating the values of the element by using the linear scheduling method.

The conversion method column D34 stores a conversion method from another element to the relevant element when the determination method is "variable conversion". For example, the conversion method column D34 of the element "x" with the identification number "001" in the auxiliary information table D3 indicates variable conversion converting the element "y" with the identification number "003" into the element "x".

The constraint condition column D35 stores a characteristic constraint condition that is a constraint condition of the time of allocating values of the element when the determination method is "solution construction".

It is noted that, in the example of FIG. 5, the conversion method is described by a mathematical formula, and the constraint condition is described in an optimization problem description form, but the conversion method and the characteristic constraint condition are not limited to such a description language, and may be described, for example, by using a mathematical formula, an optimization problem description language, an application programming interface (API) of an optimization solver, a predetermined programming language, or the like.

Next, the schedule optimization system constructed by the schedule optimization system construction support device 100 will be described. The schedule optimization system of this embodiment is a system that implements drafting of the schedule using a plug-in depending on the schedule of the drafting target by using the auxiliary information table D3. However, the schedule optimization system is not limited to the mode using the plug-in.

FIG. 6 is a block diagram illustrating a functional configuration of the schedule optimization system according to this embodiment.

A schedule optimization system 300 illustrated in FIGS. 6 includes a scheduled data storage area 310, a schedule result storage area 390, and a source code D5. The source code D5 is a source code for implementing a framework unit 320, a scheduled data reading unit 330, a solution construction unit 340, a variable conversion unit 350, a linear scheduling unit 360, a schedule evaluation unit 370, and a schedule output unit 380, as functional units.

The scheduled data storage area 310 stores the scheduled data table D2. The scheduled data storage area 310 may be the same as or different from the scheduled data storage area 122 in the schedule optimization system construction support device 100. The schedule result storage area 390 stores a schedule result (not illustrated) that is a schedule drafted by the schedule optimization system 300.

The framework unit 320 mediates the transmission and the reception of the data between the functional units. The scheduled data reading unit 330 reads the scheduled data table D2 from the scheduled data storage area 310.

The solution construction unit 340, the variable conversion unit 350, and the linear scheduling unit 360 are a schedule drafting unit that performs a schedule drafting process of determining the value of the element of which the type is "determination variable" in the optimization problem description table D1 based on the scheduled data table D2 read by the scheduled data reading unit 330. Specifically, the solution construction unit 340 allocates the value to the element of which the determination method is "solution construction" in the auxiliary information table D3. The variable conversion unit 350 determines the value of the element of which the determination method is "variable conversion" in the auxiliary information table D3. The linear scheduling unit 360 determines the value of the element of which the determination method is "linear scheduling" in the auxiliary information table D3.

The schedule evaluation unit 370 evaluates the drafted schedule. The schedule output unit 380 outputs the drafted schedule.

FIG. 7 is a flowchart illustrating the overall processes of the schedule optimization system 300. In addition, in the following description, the description of the processes of the framework unit 320 is omitted.

In step S101, the scheduled data reading unit 330 reads the scheduled data table D2 from the scheduled data storage area 310.

In step S102, the solution construction unit 340, the variable conversion unit 350, and the linear scheduling unit 360 execute a schedule drafting process (refer to FIG. 8) of drafting the schedule based on the scheduled data table D2 read by the scheduled data reading unit 330. Herein, the schedule specifically means a set of the elements of which the type is the "determination variable" in the optimization problem description table D1. In addition, the drafting a schedule is a process of determining (allocating) the value for each element included in the schedule.

In step S103, the schedule evaluation unit 370 calculates an evaluation value obtained by evaluating the schedule drafted in step S102 based on the auxiliary information table D3. For example, in the auxiliary information table D3, the schedule evaluation unit 370 calculates an element "obj", which is an evaluation index "F", as an evaluation value by the linear scheduling, which is a determination method.

In step S104, the schedule evaluation unit 370 determines whether a predetermined end condition is satisfied. The end condition is, for example, that the evaluation value satisfies a predetermined allowable condition, that the number of times or the time of drafting the schedule is a threshold or more, or that the drafting of the schedule is not changed continuously for a predetermined number of times.

When the end condition is satisfied, the process of step S105 is executed; and when the end condition is not satisfied, the process returns to step S102. It is noted that, when returning to the process of step S102, the parameters used for the schedule drafting are appropriately changed.

In step S105, the schedule output unit 380 outputs a schedule result indicating the drafted schedule, stores the schedule result in the schedule result storage area 390, and ends the process.

FIG. 8 is a flowchart illustrating the schedule drafting process of step S102 in FIG. 7.

In step S201, the solution construction unit 340 constructs a solution by using a set of the elements of which the determination method is "solution construction" in the auxiliary information table D3. Herein, constructing a solution means allocating a value to each element included in the solution. Algorithms for constructing solutions are metaheuristics such as a local neighborhood search method and a genetic algorithm, but the algorithms for constructing solutions are not limited thereto.

It is noted that in step S201, when there is a constraint condition for the element of which the determination method is "solution construction" in the auxiliary information table D3, the solution construction unit 340 allocates the value of the element by using the constraint condition. For example, in the case of allocating a value to the element with the identification number "0003" in the auxiliary information table D3, since the alldifferent constraint exists as a constraint condition, the solution construction unit 340 allocates a value so as to satisfy the alldifferent constraint. It is noted that the alldifferent constraint is a constraint requiring that the value of the element included in the solution are all different. Accordingly, it is possible to construct the solutions more efficiently than when there is no constraint condition.

In step S202, the variable conversion unit 350 determines the value of the element of which determination method is "variable conversion" in the auxiliary information table D3 by converting the value of the element included in the solution constructed in step S201 according to the conversion method of the auxiliary information table D3. For example, when determining the value of the element with the identification number "001" in the auxiliary information table D3, the variable conversion unit 350 determines the value of the element x[i] with the identification number "001" from the solution y[i] with the identification number "003" by using the conversion "x[i]=a[i] [0] *(y[i]<1?1:0)" indicated in the conversion method.

In step S203, the linear scheduling unit 360 determines the value of the element for which the determination method is a "linear scheduling method" (that is, the elements that have not yet been drafted) in the auxiliary information table D3 by using the linear scheduling method and ends the process. At this time, the linear scheduling unit 360 fixes the values of the element determined in steps S201 and S202. For example, the linear scheduling unit 360 determines the value of the element "obj" with the identification number "0002" in the auxiliary information table D3 by the linear scheduling method while fixing the value of the element "x" with the identification number "001". It is noted that, since the linear scheduling method is a well-known technique, a detailed description thereof will be omitted.

FIG. 9 is a flowchart illustrating the overall processes of the schedule optimization system construction support device 100.

In step S301, the user of the schedule optimization system construction support device 100 generates the optimization problem description table D1 and the scheduled data table D2 by using user's own information processing device (for example, the customer system 400 in FIG. 15).

In step S302, the auxiliary information table D3 is generated based on the optimization problem description table D1 and the scheduled data table D2. Herein, the user of the schedule optimization system construction support device 100 generates the auxiliary information table D3 by using user's own information processing device. However, the schedule optimization system construction support device 100 may have a function of generating the auxiliary information table D3 based on the optimization problem description table D1 and the scheduled data table D2.

In step S303, the input analysis unit 140 of the schedule optimization system construction support device 100 receives the generated optimization problem description table D1, scheduled data table D2, and auxiliary information table D3 and analyzes each of the received tables to generate analysis result.

In step S304, the output generation unit 150 generates the source code D5 based on the analysis result generated by the input analysis unit 140 and the template D4.

In step S305, the compilation unit 160 generates an object code by reading the source code D5 generated by the input analysis unit 140 into the memory 250 and compiling the source code D5 and constructs the schedule optimization system while allowing the scheduled data storage area 310 and the schedule result storage area 390 to be in a communicable state.

Hereinafter, a generation process of generating the source code D5 in step S304 will be described in more detail. Herein, it is assumed that the schedule optimization system 300 illustrated in FIG. 6 is constructed. In addition, since the generation of the source code D5 is performed by using the template D4, first, the template D4 will be described.

FIG. 10 is a diagram illustrating a configuration example of the template D4. As illustrated in FIG. 10, the template D4 includes a plurality of functional unit templates corresponding to the respective functional units (320 to 380) of the schedule optimization system 300. Specifically, the template D4 includes, as the functional unit templates, a framework unit template D41 corresponding to the framework unit 320, a scheduled data reading unit template D42 corresponding to the scheduled data reading unit 330, a solution construction unit template D43 corresponding to the solution construction unit 340, a variable conversion unit template D44 corresponding to the variable conversion unit 350, a linear scheduling unit template D45 corresponding to the linear scheduling unit 360, a schedule evaluation unit template D46 corresponding to the schedule evaluation unit 370, and a schedule output unit template D47 corresponding to the schedule output unit 380.

In the example of FIG. 10, one functional unit corresponds to one function template, but one functional unit may correspond to a plurality of the function templates. In addition, the template D4 may include a template for generating files other than the source code D5. For example, the template D4 may include a template for the template for generating the function template corresponding to the specific functional unit. By using the template for the template, it is possible to generate the function template including a control structure such as repeating the same syntax, and thus, it is possible to improve the ability to describe the function template.

The functional unit template contains information independent of the optimization problem description table D1 and the scheduled data table D2 and is combined with the analysis result generated by the input analysis unit 140 to generate the source code D5. Specifically, a combination of the functional unit template and the analysis result is performed by inserting an insertion element, which is information based on the analysis result, into the placeholder in the functional unit template, and is implemented by a so-called template engine. Information based on the analysis result includes information included in the analysis result and information included in the summary information generated from the analysis result. It is noted that the placeholder is an insertion portion into which the insertion element is inserted. It is noted that the template D4 is different from a program library in that information based on the analysis result can be inserted.

FIG. 11 is a diagram illustrating an example of the template D4 and the source code D5.

FIG. 11(A) illustrates an example of the scheduled data reading unit template D42. The scheduled data reading unit template D42 illustrated in FIG. 11(A) includes placeholders D421 to D424 into which the insertion elements are inserted. The placeholders D421 to D424 are enclosed in braces {and} in the example of FIG. 11(A).

In addition, the placeholder may also contain form designation information indicating the form of the insertion element. In the example of FIG. 11(A), the placeholder D421 contains form designation information D425; and the placeholder D423 contains form designation information D426. The form designation information D425 "upper" indicates that the insertion element is inserted in upper-case letters; and the form designation information D426 "join" indicates that a plurality of the insertion elements are combined and inserted.

The placeholders D421 to D423 are for inserting information included in the analysis result; and the placeholder D424 is for inserting information included in the summary information. It is noted that information included in the analysis result includes information included in the optimization problem description table D1, the scheduled data table D2, and the auxiliary information table D3.

FIG. 11(B) is a diagram illustrating an example of a source code D52 generated from the scheduled data reading unit template D42 illustrated in FIG. 11(A). The source code D52 includes character strings D521 to D524 in which the insertion elements are inserted into the placeholders D421 to D424, respectively.

Since the description form of the functional unit templates other than the scheduled data reading unit template D42 is the same as the description form of the scheduled data reading unit template D42, and thus, the description thereof will be omitted.

Figure 12:
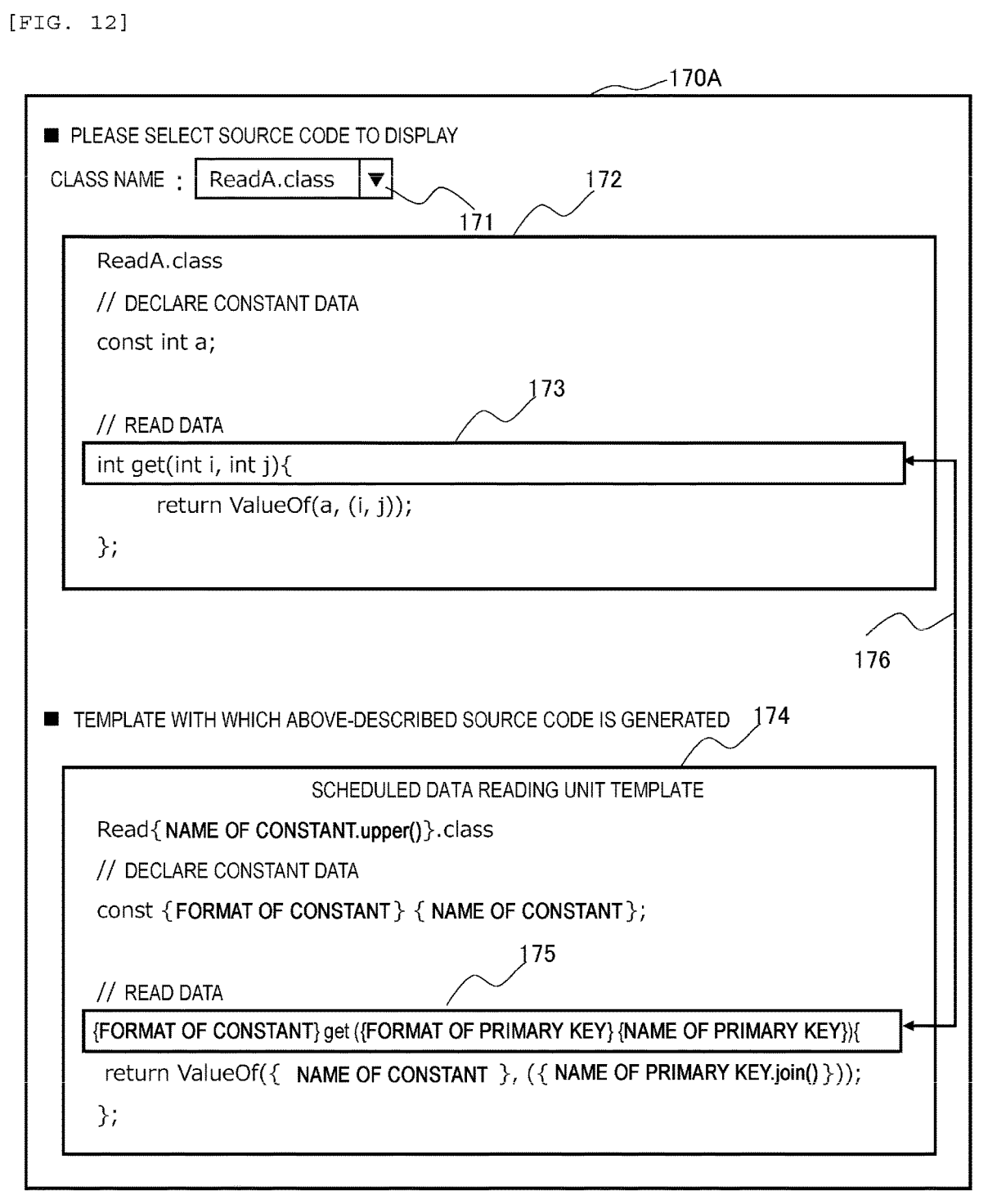

FIG. 12 is a diagram illustrating an example of a display screen on which information in the storage unit 120 is displayed by the display unit 170. For example, after the source code D5 is generated, the display screen is displayed according to an instruction from the user.

A display screen 170A illustrated in FIG. 12 includes a source code selection area 171, a source code display area 172, a source code emphasizing portion 173, a template display area 174, a template emphasizing portion 175, and a correspondence indicator 176.

The source code selection area 171 is an area for selecting the source code. The source code display area 172 is an area for displaying the source code selected in the source code selection area 171. The source code emphasizing portion 173 emphasizes the designation portion designated by the user in the source code displayed in the source code display area 172. In the example of FIG. 12, the source code emphasizing portion 173 emphasizes the designation portion by surrounding the designation portion with an enclosing line.

The template display area 174 is an area for displaying a template that is a pattern of the source code displayed in the source code display area 172. The template emphasizing portion 175 emphasizes and displays a portion of the template corresponding to the designation portion of the source code emphasized in the source code emphasizing portion 173. In the example of FIG. 12, a portion of the template is emphasized by being surrounded by an enclosing line.

The correspondence indicator 176 indicates a correspondence relationship between the source code emphasizing portion 173 and the template emphasizing portion 175.

By displaying the template D4 and the source code D5 in association with each other as in the example of FIG. 12, it can be visually confirmed that the source code D5 is generated by the schedule optimization system construction support device 100.

FIG. 13 is a flowchart illustrating an example of an input analysis process by the input analysis unit 140 in step S303 of FIG. 9.

In step S401, the input analysis unit 140 receives the optimization problem description table D1, the scheduled data table D2, and the auxiliary information table D3.

In step S402, the input analysis unit 140 generates one table as an analysis result by combining the optimization problem description table D1, the scheduled data table D2, and the auxiliary information table D3.

In step S403, the input analysis unit 140 allows the user to determine whether the summary information is required. At this time, the input analysis unit 140 may display a display screen illustrating the analysis result and the like. It is noted that, for example, the user determines whether the schedule optimization system can be efficiently constructed by using the summary information and whether, finally, the summary information is required by determining whether a certain amount or more of insertion portion for inserting information included in the summary information exists in the template D4. When the summary information is required, the input analysis unit 140 executes the process of step S404; and when the summary information is not required, the input analysis unit 140 skips the process of step S404 and executes the process of step S405. It is noted that the input analysis unit 140 may automatically determine whether the summary information is required.

In step S404, the input analysis unit 140 generates the summary data table D6 as the summary information based on the analysis result and stores the summary data table D6 in the summary data storage area 126.

In step S405, the input analysis unit 140 passes the analysis result to the output generation unit 150 and ends the process.

The summary data table D6 is information summarizing the analysis result in the mode that does not depend on the template D4. For example, the summary data table D6 includes statistical values of available value of the element included in the analysis result. More specifically, the summary data table D6 includes information obtained by summarizing the information in the primary key column D22 of the scheduled data table D2 into statistical values (for example, a maximum value, a minimum value, an average value, and the like) of available values of the primary key. In addition, when the analysis result is an object on the memory 250 which can be referred to by the program, the summary data table D6 may be a file on the auxiliary storage device 240.

FIG. 14 is a flowchart illustrating an example of an output generation process by the output generation unit 150 in step S304 of FIG. 9.

In step S501, the output generation unit 150 acquires the analysis result from the input analysis unit 140. In addition, when the summary data table D6 exists in the summary data storage area 126, the output generation unit 150 acquires the summary data table D6. In the following, the data (the analysis result and the summary data table D6) acquired by the output generation unit 150 will be referred to as an insertion element.

After that, the output generation unit 150 executes a loop process (A) of repeating the processes of steps S502 to S504 for each template corresponding to each functional unit.

In step S502, the output generation unit 150 specifies the placeholders included in the template. The output generation unit 150 specifies the placeholders by, for example, searching for braces "{" and "}" from the template.

After that, the output generation unit 150 executes a loop process (B) of repeating processes of steps S503 to S504 for each specified placeholder.

In step S503, the output generation unit 150 performs a form conversion process of converting the form of the insertion element to be inserted into the placeholder into the form (pattern form) of the programming language describing the schedule optimization system 300. Specifically, the form conversion process is a process of converting the form of the insertion element according to the form designation information included in the placeholder, for example, a process of converting the insertion element into upper-case letters or lower-case letters (refer to D425 of FIG. 11(A)), and a process of dividing or combining the insertion element (refer to D426 of FIG. 11(A)).

In step S504, the output generation unit 150 inserts the insertion element of which the form is converted into the placeholder.

When executing the processes of steps S503 and S504 for all the specified placeholders, the output generation unit 150 ends the loop process (B). Further, when executing the processes of steps S502 to S504 for all templates, the output generation unit 150 ends the loop process (A) and executes the process of step S505.

In step S505, the output generation unit 150 stores each template into which the insertion element is inserted as the source code D5 in the source code storage area 125 and ends the process.

It is noted that the insertion elements to be inserted into the placeholder are, for example, all the insertion elements that can be inserted, and the source code D5 corresponding to each of all the elements is generated.

Further, after step S505, the compilation unit 160 may generate the object code by reading the source code D5 from the source code storage area 125 and compiling the source code D5. The compilation unit 160 may have a function of verifying the source code D5. In this case, since bugs and the like included in the source code D5 can be detected immediately after the source code D5 is generated, it is possible to improve the quality of the source code D5.

FIG. 15 is a diagram illustrating an example of a cooperation method between the schedule optimization system construction support device 100 and the customer system 400. The schedule optimization system construction support device 100 and the customer system 400 are interconnected via a network 500.

In the example of FIG. 15, the schedule optimization system construction support device 100 transfers the generated source code D5 from the source code storage area 125 to the customer system 400. The customer system 400 reads the transferred source code D5 into a memory (not illustrated) and allows the source code D5 to be in a communicable state with the scheduled data storage area 401 and the schedule result storage area 402 of the customer system 400. Accordingly, the schedule optimization system 300 can be constructed on the customer system 400.

As described above, according to this embodiment, the storage unit 120 stores the optimization problem description table D1 indicating the optimization problem for drafting the schedule in the schedule optimization system 300, the scheduled data table D2 indicating the value of the constant that is an element fixed in the optimization problem, and the template D4 that is a pattern of the source code of the schedule optimization system. The processing unit 130 generates the source code of the schedule optimization system by inserting information based on the optimization problem description table D1 and the scheduled data table D2 into the template. For this reason, since it is possible to generate the source code that is considered to be information according to the schedule to be drafted without using past assets, the schedule optimization system that can easily solve a complicated optimization problem without using the past assets can be developed.

In addition, in this embodiment, the processing unit 130 generates the source code of the schedule optimization system by inserting information according to the auxiliary information table D3 indicating constraint condition according to the schedule for the optimization problem into the template. Therefore, since the source code can be generated by using the auxiliary information table D3 that is specialized for the schedule to be drafted, the schedule optimization system based on the plug-in that is specialized for the schedule to be drafted can be developed with small development man-hours.

In addition, in this embodiment, the processing unit 130 generates the summary data table D6 summarizing the optimization problem description table D1 and the scheduled data table D2, and generates the source code based on the summary data table D6. Therefore, when there is a change in the schedule optimization system 300, and thus, the template D4 is replaced, in comparison to the case where the summary data table D6 is not generated, the development man-hours can be reduced. The changes in the schedule optimization system 300 includes, for example, additions and deletions of functional units or processing flows in accordance with a change in requirements from customers, a change in the programming language describing the source code D5, or the like.

In addition, in this embodiment, the template D4 includes a plurality of functional unit templates corresponding to the respective functional units of the schedule optimization system 300. For this reason, it is possible to develop the schedule optimization system with the small development man-hours.

Heretofore, the present invention has been described above by using the embodiment, but the technical scope of the present invention is not limited to the scope disclosed in the above-described embodiment, and various modifications are included. For example, the above-described embodiments have been described in detail in order to describe the present invention in an easy-to-understand manner, and thus, those having all the described configurations is not necessarily limited to be included. Moreover, it is possible to add, delete, or replace a portion of the configuration of the embodiment with another configuration.

In addition, the execution order of each process such as operations, the procedures, or the steps in the functions, the systems, and the methods illustrated in the claims, the specification, and the drawings can be implemented in any order as long as "earlier", "before", or the like is not specifically clarified, and the output of a previous process is not used in a later process. With respect to the operation flow in the claims, the specification, and the drawings, for the convenience, even when the description is made by using "first", "next", or the like, it does not mean that it is essential to execute the operations in this order.

REFERENCE SIGNS LIST

100: schedule optimization system construction support device
110: input unit
120: storage unit
130: processing unit
140: input analysis unit
150: output generation unit
160: compilation unit
170: display unit
300: schedule optimization system
310: scheduled data storage area
320: framework unit
330: scheduled data reading unit
340: solution construction unit
350: variable conversion unit
360: linear scheduling unit
370: schedule evaluation unit
380: schedule output unit
390: schedule result storage area
400: customer system

The invention claimed is:

1. A schedule optimization system construction support device supporting construction of a schedule optimization system solving an optimization problem for drafting a schedule, the schedule optimization system construction support device, comprising:

a storage unit; and a processing unit, wherein the storage unit stores optimization problem information indicating the optimization problem, scheduled data indicating a value of a constant being a fixed element in the optimization problem, and a template as a pattern of a source code of the schedule optimization system, wherein the template comprises placeholders for receiving inserted information, wherein the processing unit generates the source code by replacing the placeholders with the information based on the optimization problem information and the scheduled data, wherein the processing unit automatically generates an intermediate representation by combining the optimization problem information, the scheduled data, and auxiliary information into a unified analysis result, and wherein the processing unit performs form conversion of insertion elements according to form designation information included in the placeholders to convert the insertion elements into a specific programming language format before inserting the converted insertion elements into the placeholders.

2. The schedule optimization system construction support device according to claim 1, wherein the template comprises a plurality of functional unit templates including a framework unit template, a scheduled data reading unit template, a solution construction unit template, a variable conversion unit template, a linear scheduling unit template, a schedule evaluation unit template, and a schedule output unit template, and wherein the processing unit generates the source code by executing a loop process that specifies the placeholders in each functional unit template and inserts corresponding elements of the insertion elements into the specified placeholders.

3. A schedule optimization system construction support device supporting construction of a schedule optimization system solving an optimization problem for drafting a schedule, the schedule optimization system construction support device, comprising:

a storage unit; and a processing unit, wherein the storage unit stores optimization problem information indicating the optimization problem, scheduled data indicating a value of a constant being a fixed element in the optimization problem, and a template as a pattern of a source code of the schedule optimization system, wherein the template comprises placeholders for receiving inserted information, wherein the processing unit generates the source code by replacing the placeholders with the information based on the optimization problem information and the scheduled data, and wherein the processing unit generates the source code to implement the schedule optimization system that includes a solution construction unit that allocates values to elements using metaheuristic algorithms including local neighborhood search methods and genetic algorithms, a variable conversion unit that determines values by converting other element values according to conversion methods, and a linear scheduling unit that determines remaining element values using linear scheduling methods while fixing previously determined values.

4. The schedule optimization system construction support device according to claim 1, wherein the processing unit generates the source code by executing an input analysis process that receives the optimization problem information, the scheduled data, and auxiliary information tables, combines them into a single analysis result table, and wherein the processing unit executes an output generation process that specifies placeholders by searching for braces "{" and "}" in the template, performs form conversion of the insertion elements according to form designation information contained within the placeholders, and inserts the converted insertion elements into the placeholders to generate the source code.

5. The schedule optimization system construction support device according to claim 1, wherein the template comprises functional unit templates that contain information independent of the optimization problem information and the scheduled data, wherein each functional unit template includes placeholders that are insertion portions enclosed in braces and contain form designation information indicating forms of the insertion elements, and wherein the processing unit implements a template engine that combines the functional unit templates with an analysis result by inserting the insertion elements based on the analysis result into the placeholders according to the form designation information.

6. The schedule optimization system construction support device according to claim 3, wherein the processing unit generates the source code to implement the schedule optimization system that performs a schedule drafting process by executing the solution construction unit that constructs solutions using metaheuristic algorithms while applying constraint conditions from auxiliary information, the variable conversion unit determines element values by converting the other element values according to the conversion methods specified in the auxiliary information, and the linear scheduling unit determines remaining element values using the linear scheduling methods while fixing values determined by the solution construction unit and the variable conversion unit.

7. A schedule optimization system construction support device supporting construction of a schedule optimization system solving an optimization problem for drafting a schedule, the schedule optimization system construction support device, comprising:

a storage unit; and a processing unit, wherein the storage unit stores optimization problem information indicating the optimization problem, scheduled data indicating a value of a constant being a fixed element in the optimization problem, and a template as a pattern of a source code of the schedule optimization system, wherein the template comprises placeholders for receiving inserted information, wherein the processing unit generates the source code by replacing the placeholders with the information based on the optimization problem information and the scheduled data, and wherein the processing unit automatically generates the source code by parsing structured optimization problem information and scheduled data tables, inserting specific data elements into predefined placeholders within functional unit templates, and compiling the generated source code into executable object code for the schedule optimization system that solves scheduling problems with multiple determination variables and constraint conditions.

* * * * *